(12) United States Patent
Moriwaki et al.

(10) Patent No.: US 10,538,610 B2
(45) Date of Patent: Jan. 21, 2020

(54) THERMOSETTING RESIN COMPOSITION

(71) Applicant: KYOEISHA CHEMICAL CO., LTD., Osaka-shi, Osaka (JP)

(72) Inventors: Yuya Moriwaki, Nara (JP); Kosuke Asada, Nara (JP); Masaru Donkai, Nara (JP)

(73) Assignee: KYOEISHA CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/205,681

(22) Filed: Nov. 30, 2018

(65) Prior Publication Data
US 2019/0092889 A1 Mar. 28, 2019

Related U.S. Application Data (63) Continuation-in-part of application No. PCT/JP2018/030764, filed on Aug. 21, 2018.

(51) Int. Cl.
*C08F 220/18* (2006.01)
*C09D 133/10* (2006.01)
*C09J 133/10* (2006.01)

(52) U.S. Cl.
CPC ......... *C08F 220/18* (2013.01); *C09D 133/10* (2013.01); *C09J 133/10* (2013.01); *C08F 2220/1825* (2013.01); *C08F 2800/20* (2013.01); *C08F 2810/50* (2013.01)

(58) Field of Classification Search
CPC ............. C08F 220/18; C08F 2810/50; C08F 2800/20; C08F 2200/1825; C09D 133/10; C09J 133/10
USPC ........................................................ 524/556
See application file for complete search history.

(56) References Cited

U.S. PATENT DOCUMENTS

| | | | |
|---|---|---|---|
| 4,897,450 A * | 1/1990 | Craun | C08F 8/14 525/111 |
| 4,900,592 A | 2/1990 | Hahn, Jr. et al. | |
| 4,906,693 A | 3/1990 | Craun et al. | |
| 2005/0009996 A1 * | 1/2005 | Inaba | C08F 8/00 525/330.3 |
| 2005/0014924 A1 * | 1/2005 | Inaba | C08F 8/30 528/310 |

FOREIGN PATENT DOCUMENTS

| | | |
|---|---|---|
| JP | S51-55324 | 5/1976 |
| JP | 01-104666 A | 4/1989 |
| JP | 05-25431 A | 2/1993 |
| JP | 07-157545 A | 6/1995 |
| JP | H09-59543 A | 3/1997 |
| JP | H09302271 A | 11/1997 |
| JP | 2003-253194 A | 9/2003 |
| JP | 2005-248086 A | 9/2005 |
| JP | 2015-42697 A | 9/2005 |
| JP | 2005248086 A * | 9/2005 |
| JP | 2011-209679 A | 10/2011 |
| JP | 2013-28772 A | 2/2013 |

OTHER PUBLICATIONS

Inui, Tadashi et al., "Organotellurium-Mediated Living Radical Polymerization (TERP) of Acrylates Using Ditelluride Compounds and Binary Azo Initiators for the Synthesis of High-Performance Adhesive Block Copolymers for On-Demand Dismantiable Adhesion", Macromolecules, 2013, 90.30, vol. 46, Issue 20, pp. 8111-8120.

* cited by examiner

*Primary Examiner* — Michael Bernshteyn
(74) *Attorney, Agent, or Firm* — Ladas & Parry LLP; Malcolm J. MacDonald (57) ABSTRACT

A thermosetting resin composition using a transesterification reaction as a curing reaction, which has a good curability and can be used in various applications. A thermosetting resin composition comprising a polymer (A) composed of a monomer having a (meth) acrylic acid tertiary alkyl ester and a monomer having a hydroxyl group as a structural unit, and a transesterification catalyst (B) as an essential component, and being organic solvent-type or water-borne, wherein the polymer (A) has a glass transition temperature of 80° C. or lower.

1 Claim, 4 Drawing Sheets

THERMOSETTING RESIN COMPOSITION

TECHNICAL FIELD

The present invention relates to a thermosetting resin composition using a transesterification reaction as curing reaction.

BACKGROUND OF THE DISCLOSURE

In the fields of a coating and an adhesive, various thermosetting resin compositions are used. In many of such thermosetting resin compositions, a resin having two or more hydroxyl groups is used in combination with a curing agent and the resin is cured by a crosslinking reaction between the curing agent and the hydroxyl group.

As the curing agent, melamine resins, epoxy compounds, and polyisocyanate compounds are used. These curing agents are widely and generally used because the curing agents nave a good thermal reactivity and cured resins obtained by using the curing agent have superior characteristics. However, the melamine resin is presumed as the cause of sick house syndrome because it generates formaldehyde, so that it has been restricted in uses. In addition, if it is used in a coating, a problem in acid resistance is known to occur because of its chemical structure.

Epoxy compounds are said to have a low storage stability and a high curing temperature, though they are high in curability and coating film properties. Polyisocyanate curing system is said to be high in cost and show a narrow range of design though they are high in curability and coating film properties. On the other hand, the curing system of the present invention has a high curability and a wide range of design to develop the desired coating film properties, and has a high storage stability and does not by-produce harmful substances.

Patent document 1 discloses a powder coating using a transesterification reaction as a curing reaction. However, only the use of a powder coating is disclosed, and the use of general solvent-type or water-borne compositions is not disclosed.

Further, if used as a coating and an adhesive agent, water resistance is required but this point is not disclosed. Actually, a solvent-type coating was prepared by the method of patent document 1 and evaluated so that a sufficient water resistance or crosslinking reactivity cannot be achieved. That is, a specific method for applying the composition to a coating and an adhesive agent in the form of a solvent-type or a water-borne composition is not disclosed in patent document 1.

Patent document 2 discloses a coating using a transesterification reaction as a curing reaction. In this document, a detailed composition of the resin to be used is not restricted, and a composition which can be suitably used for a curable composition through a transesterification reaction is not identified.

PRIOR TECHNICAL DOCUMENTS

Patent Documents

[Patent Document 1]Japanese Kokai Publication Hei9-59543

[Patent Document 2]Japanese Kokai Publication Hei2-147675

SUMMARY OF INVENTION

Problems to be Solved by the Invention

In view of the above, it is an object of the present invention to provide an organic solvent-type or water-borne thermosetting resin composition using a transesterification reaction as a curing reaction, which has a good curability and can be used in various applications.

Means for Solving Object

The present invention relates to a thermosetting resin composition comprising a polymer (A) composed of a monomer having a (meth)acrylic acid tertiary alkyl ester and a monomer having a hydroxyl group as a structural unit, and a transesterification catalyst (B) as an essential component, and being organic solvent-type or water-borne, wherein the polymer (A) has a glass transition temperature of 80° C. or lower.

The present invention relates to a cured film formed by three-dimensionally crosslinking the above-mentioned thermosetting resin composition.

The present invention relates to a method for forming a cured film comprising a step of applying the above-mentioned thermosetting resin composition on an article to be coated to form a film and a step of heating and curing.

Effects of the Invention

The thermosetting resin composition of the present, invention does not generate formaldehyde and is highly safe and can preferably be used as a new thermosetting resin composition in place of conventional isocyanate type or melamine type curing system. In addition, the resin composition may be a low temperature curable composition.

DETAILED DESCRIPTION OF PREFERRED EMBODIMENTS

Hereinafter, the present invention will be described in detail.

The thermosetting resin composition of the present invention comprises a polymer composed of a tertiary alkyl (meth) acrylate as a structural unit and a transesterification catalyst, and is organic solvent-type or water-borne.

That is, the tertiary alkyl (meth)acrylate is liable to undergo transesterification reaction, thus the transesterification reaction described above is proceeded easily. Therefore, the polymer (A) comprising this as a part or the whole of the structural unit can be used suitably as an organic solvent-type or water-borne thermosetting resin composition using the transesterification reaction as a curing reaction.

The transesterification reaction is more likely to occur in secondary esters than primary esters, and still more in tertiary esters than secondary esters. Thus, the tertiary ester is preferred in order to effectively proceed the reaction.

Further, in order to improve reactivity, it is preferable that the structure has no steric hindrance and the reaction point moves more flexibly. By this, the transesterification reaction can be promoted more favorably. However, the tertiary alkyl (meth)acrylate has a high Tg and does not have a flexible structure. Therefore, it became clear that the transesterification reaction could be improved by adding a copolymer to lower the polymer Tg and introducing a monomer with a longer side chain having an ester group or a hydroxyl group at the end.

Such a study has not been made in Patent Document 1, and since the transesterification reaction is difficult to proceed sufficiently due to the high Tg, it is necessary to carry out a transesterification reaction at a high temperature. In addition, it is considered that only the decomposition reaction of the ester occurs due to the high Tg, and the carboxyl group which cannot be crosslinked lowers the water resistance.

Furthermore, since it is not a powder coating composition but a solvent-type or water-borne composition, low temperature curing can be carried out. That is, the transesterification reaction is a reaction which can be generated even at a relatively low temperature. However, in the powder coating composition, since it is necessary to fluidize the powder by heating, curing is performed at a high temperature of 150° C. or higher.

However, since the thermosetting resin composition of the present invention is organic solvent-type or water-borne, a film is thinned by a coating-drying step. Therefore, the temperature at the time of flowing by heating can be lowered, and a curing reaction can be caused by curing at a low temperature of 150° C. or less.

In the following description, "(meth)acrylate" means acrylate and/or methacrylate. "(Meth)acrylic acid" means acrylic acid and/or methacrylic acid. "(Meth)acryloyl" means acryloyl and/or methacryloyl. "(Meth)acrylamide" means acrylamide and/or methacrylamide.

The thermosetting resin composition of the present invention essentially comprises a polymer (A) composed of tertiary alkyl (meth)acrylate as a structural unit. The polymer used in the present invention is a polymer (A) which also essentially includes a hydroxyl group.

The tertiary alkyl (meth)acrylate is not particularly limited, but may include tertiary butyl (meth)acrylate, compounds obtained by introducing a tertiary alkyl ester group at the ends of (meth)acrylate modified product, and the like.

Tertiary butyl (meth)acrylate tends to undergo transesterification reaction, and is preferable because the component generated by the transesterification reaction is volatilized easily from the composition at a low boiling point and the curing reaction easily occurs.

An amount of the structural unit having the tertiary alkyl (meth)acrylate as a skeleton is preferably 1% by weight or more in the polymer (A). When it is less than 5% by weight, the amount of the crosslinkable functional group becomes small, so that the curing reaction does not proceed sufficiently, which is not preferable. The upper limit thereof is not particularly limited, and a homopolymer of the tertiary alkyl (meth)acrylate may be used.

The polymer (A) may comprise a structural unit having a monomer other than the tertiary alkyl (meth)acrylate as a skeleton in part.

The structural unit having a monomer other than the tertiary alkyl (meth)acrylate as a skeleton in the polymer (A) is not particularly limited, and monomers as described in detail below can be exemplified.

Various α-olefins such as ethylene, propylene, or butane-1;
  various halogenated olefins except fluoroolefin such as vinyl chloride or vinylidene chloride,
  (meth)acrylates having 1 to 18 carbon atoms, such as various alkyl (meth)acrylates as well as various cycloalkyl (methlacrylates, aralkyl (meth)acrylates, phenyl (meth) acrylates or substituted phenyl group-containing (meth)acrylate;
  various aromatic vinyl compounds such as styrene, α-methylstyrene or vinyltoluene;
  various amino group-containing amide unsaturated monomers such as N-dimethylaminoethyl (meth)acrylamide, N-diethylaminoethyl (meth)acrylamide, N-dimethylaminopropyl (meth)acrylamide or N-diethylaminopropyl (meth)acrylamide;
  various dialkylaminoalkyl (meth)acrylates such as dimethylaminoethyl (meth)acrylate or diethylaminoethyl (meth)acrylate;
  various amino group-containing monomers such as tert-butylaminoethyl (meth)acrylate, tert-butylaminopropyl (meth)acrylate, aziridinyl ethyl (meth)acrylate, pyrrolidinylethyl (meth)acrylate or piperidinylethyl(meth) acrylate;
  various carboxyl group-containing monomers such as (meth)acrylic acid, crotonic acid, itaconic acid, maleic acid or fumaric acid;
  various epoxy group-containing monomers such as glycidyl (meth) acrylate, β-methylglycidyl (meth)acrylate or (meth)allyl glycidyl ether;
  mono- or diesters of various α, β-unsaturated dicarboxylic acids such as maleic acid, fumaric acid or itaconic acid with monohydric alcohols having 1 to 18 carbon atoms;
  various hydrolyzable silyl group-containing monomers such as vinyltrimethoxysilane, vinyltriethoxysilane, vinyltripropoxysilane, vinylmethyldiethoxysilane, vinyltris (β-methoxyethoxy) silane, allyltrimethoxysilane, trimethoxysilylethyl vinyl ether, triethoxysilylethyl vinyl ether, methyldimethoxysilyl ethyl vinyl ether, trimethoxysilyl propyl vinyl ether, triethoxysilylpropyl vinyl ether, methyldiethoxysilylpropyl vinyl ether, γ-(meth)acryloyloxypropyltrimethoxysilane, γ-(meth)acryloyloxypropyltriethoxysilane or γ-(meta)acryloyloxypropylmethyldimethoxysilane;
  various fluorine-containing α-olefins such as vinyl fluoride, vinylidene fluoride, trifluoroethylene, tetrafluoroethylene, chlorotrifluoroethylene, bromotrifluoroethylene, pentafluoropropylene or hexafluoropropylene;
  various fluorine atom-containing monomers such as various perfluoroalkyl perfluorovinyl ether or (per) fluoroalkyl vinyl ether (provided that the alkyl group has 1 to 18 carbon atoms) including trifluoro methyl trifluorovinyl ether, pentafluoroethyl trifluorovinyl ether or heptafluoropropyl trifluorovinyl ether;
  various alkyl vinyl ethers or substituted alkyl vinyl ethers such as methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, 2-ethylhexyl vinyl ether, chloromethyl vinyl ether, chloroethyl vinyl ether, benzyl vinyl ether or phenylethyl vinyl ether, various cycloalkyl vinyl ethers such as cyclopentyl vinyl ether, cyclohexyl vinyl ether or methyl cyclohexyl vinyl ether;

various aliphatic carboxylic acid vinyls such as vinyl 2,2-dimethyl propanoate, vinyl 2,2-dimethyl butanoate, vinyl 2,2-dimethyl pentanoate, vinyl 2,2-dimethyl hexanoate, vinyl 2-ethyl-2-methyl butanoate, vinyl 2-ethyl-2-methyl pentanoate, vinyl 3-chloro-2,2-dimethyl propanoate and the like, as well as vinyl acetate, vinyl propionate, vinyl butyrate, vinyl isobutyrate, vinyl caproate, vinyl caprylate, vinyl caprate or vinyl laurate, C9 branched aliphatic carboxylic acid vinyl, C10 branched aliphatic carboxylic acid vinyl, C11 branched aliphatic carboxylic acid vinyl or vinyl stearate;

Vinyl esters of carboxylic acids having a cyclic structure such as vinyl cyclohexane carboxylate, vinyl methyl cyclohexane carboxylate, vinyl benzoate or vinyl p-tert-butylbenzoate.

The polymer (A) used in the present invention preferably has a glass transition temperature of 80° C. or lower. Tertiary alkyl (meth)acrylate has a relatively high glass transition temperature among various acrylates. Therefore, the glass transition temperature can be brought to 80° C. or lower by using other structural units based on other monomers in combination.

According to the investigation by the inventors of the present invention, when the composition is organic solvent-type or water-borne, if the glass transition temperature of the polymer (A) exceeds 80° C., it was found that the transesterification reactivity is slow and the coating film formation was not sufficiently performed by a low temperature curing. Furthermore, even in the obtained coating film, sufficient water resistance cannot be obtained and the performance as a coating film cannot be sufficiently secured.

The glass transition temperature is preferably 80° C. or lower. The glass transition temperature is more preferably 50° C. or lower.

The reason why such a difference occurs between the case of the powder coating described in the reference 1 and the case of the organic solvent-type or the water-borne composition of the present invention is thought that when the Tg is lowered, the ester and the hydroxyl groups that are reaction points become easy to move and the reaction proceeds. In addition, when an ester group is added to a terminal having a longer side chain, the reactivity is improved by increasing the degree of freedom of the reaction point. In the powder coating of the reference 1, it is presumed that it is harder for the curing reaction to occur than in the present invention, because t-butyl methacrylate is used and the Tg is high so that the main chain is difficult to move. Also, it is assumed that the fact that good performance in terms of water resistance cannot be obtained is caused by the following mechanism; since a curing reaction is not sufficiently generated, a tertiary alkyl ester group which is easily hydrolyzed remains in the composition after curing, and the remained tertiary alkyl ester group causes deterioration of water resistance.

Further, setting the glass transition temperature to 80° C. or lower is also preferable from the viewpoint of good leveling property, crosslinking property and film property.

In the present specification, the glass transition temperature was calculated by setting the weight ratio of the monomers in each polymer portion according to the following Fox formula.

$$1/Tg = (W_1/Tg_1) + (W_2/Tg_2) + \ldots + (W_m/Tg_m)$$

$$W_1 + W_2 + \ldots + W_m = 1$$

In the formula, Tg represents the glass transition temperature of the polymer portion, and $Tg_1$, $Tg_2$, . . . , $Tg_m$ represents the glass transition temperature of each polymerizable monomer. $W_1$, $W_2$, . . . , $W_m$ represents the weight ratio of each polymerizable monomer.

As is clear from the above Fox equation, in order to bring the glass transition temperature of the polymer (A) to 30° C. or lower, it is preferable to use the polymerizable monomer having a low glass transition temperature in combination with the tertiary alkyl (meth)acrylate. Examples of such monomers include 2-ethylhexyl methacrylate, isodecyl methacrylate, n-lauryl methacrylate, alkyl (C12-13)methacrylate, isoamyl acrylate, lauryl acrylate, ethoxydiethylene glycol acrylate, 2-ethylhexyl glycol acrylate, methoxyethylene glycol acrylate, methoxydipropylene glycol acrylate, phenoxyethyl acrylate, phenoxydiethylene glycol acrylate, phenoxypolyethylene glycol acrylate, m-phenoxybenzyl acrylate, tetrahydrofurfuryl acrylate, 2-acryloyloxyethyl succinic acid, polyethylene glycol diacrylate, benzyl acrylate and others.

Further, as described above, t-butyl (meth)acrylate has high glass transition temperature. Therefore, when t-butyl (meth)acrylate is used as (meth)acrylic acid tertiary alkyl ester, the content in the resin is preferably 80% by weight or less in order to bring the glass transition point to 80° C. or lower, more preferably 50% by weight or less, and most preferably 30% by weight or less.

Since the thermosetting resin composition of the present invention uses a transesterification reaction as a curing reaction, the presence of a hydroxyl group in the system, is necessary. It is essential that such a hydroxyl group exists as a hydroxyl group in the polymer (A), and in addition thereto, a polyol resin (C) having two or more hydroxyl groups may be further compounded.

If a hydroxyl group-containing vinyl monomer is used in combination with a (meth)acrylic acid tertiary alkyl ester as a raw material of the polymer (A), the polymer (A) may be obtained as a polymer containing a hydroxyl group. Representative examples of such hydroxyl group-containing vinyl monomers are exemplified below;

various hydroxyl group-containing vinyl ethers such as 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether or 6-hydroxyhexyl vinyl ether;

addition reaction products of these various vinyl ethers and ε-caprolactone;

various hydroxyl group-containing allyl ethers such as 2-hydroxyethyl (meth)allyl ether, 3-hydroxypropyl (meth)allyl ether, 2-hydroxypropyl (meth)allyl ether, 4-hydroxybutyl (meth)allyl ether, 3-hydroxybutyl (meth)allyl ether, 2-hydroxy-2-methylpropyl (meth)allyl ether, 5-hydroxypentyl (meth)allyl ether or 6-hydroxyhexyl (meth)allyl ether; addition reaction products of these various allyl ethers and ε-caprolactone;

various hydroxyl group-containing (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth) acrylate, 4-hydroxybutyl (meth)acrylate, polyethylene glycol mono (meth)acrylate, or polypropylene glycol mono (meth)acrylate; and main components of addition reaction of these various (meth) acrylates and ε-caprolactone.

A content of the hydroxyl group contained in the polymer (A) may be arbitrarily adjusted depending on the crosslinking density for transesterification reaction with tertiary alkyl (meth)acrylate, but in the case of simple crosslinking, the content is preferably around equimolar with tertiary alkyl (meth)acrylate. In particular, in applications requiring high adhesion and water-solubility, it is preferable to add it in excess molar amount relative to tertiary alkyl (meth)acrylate.

The polymer (A) preferably has a number average molecular weight of 1,000 to 100,000, The number average molecular weight is a value of a molecular weight measured by gel permeation chromatography (GPC) in terms of polystyrene.

The polymer (A) can be random copolymer, block copolymer or graft copolymer. Favorable structure can be selected for the required property and purpose.

A method for producing the polymer (A) is not particularly limited, and the polymer (A) can be produced by polymerization by a known method. More specifically, mention may be made of polymerization methods such as a solution polymerization method in an organic solvent, an emulsion polymerization method in water, a miniemulsion polymerization method in water, an aqueous solution polymerization method, a suspension polymerization method, a UV curing method, and the like.

Further, it may be water-borne one obtained by dispersing a polymer in water after a solution polymerization in an organic solvent is carried out, or may be one obtained by dissolving a resin, which is obtained by polymerization in water, in an organic solvent.

The thermosetting resin composition of the present, invention contains a transesterification catalyst (E). That is, the transesterification catalyst (B) is added to generate a transesterification reaction between the ester group and the hydroxyl group efficiently and obtain sufficient thermosetting property.

As the transesterification catalyst (B), any known compound capable of activating the transesterification reaction can be used.

Specifically, it may include, for example, various acidic compounds such as hydrochloric acid, sulfuric acid, nitric acid, acetic acid, phosphoric acid or sulfonic acid and the like; various basic compounds such as LiOH, KOH or NaOH, amines and the like; and various metal compounds such as PbO, zinc acetate, lead acetate, antimony trioxide, tetraisopropyl titanate, dibutyl tin dilaurate, dibutyl tin dioctate or monobutyl stannate, and the like. It is also possible to use a photoresponsive catalyst or a thermal latent catalyst which generates acid by light or heat.

Among them, as a material which can sufficiently exhibit the effect of the present invention, it is preferable to use a compound having a sulfonic acid group (dodecylbenzenesulfonic acid, phenolsulfonic acid, methanesulfonic acid, paratoluenesulfonic acid) or a compound having a group consisting of an alkali metal salt, an amine salt, or an ammonium salt of sulfonic acid.

Furthermore, it is most preferable to use a compound having a sulfonic acid group as an $SO_3H$ group, not "an alkali metal salt or an amine salt of sulfonic acid" being a thermal latent catalyst. The transesterification reaction, which is the curing reaction of the present invention, does not necessarily have high reactivity. Therefore, it is better to use a compound having higher acidity to obtain good curing performance.

Bisphenol A or a derivative thereof can also be used as a catalyst for transesterification. However, in the present invention, it is more preferable not to use such a compound. Such a compound is not preferable from the viewpoint that the possibility of giving an unfavorable influence to the environment is suggested.

The photoresponsive catalyst is one which generates an acid upon irradiation with light. In the present invention, the thermosetting resin composition is used, so it is required to be cured by thermal reaction. To use the photoresponsive catalyst is undesirable because heating has to be performed after light irradiation so that efficiency gets worse and in the first place, it cannot be used when the light is obstructed by blends such as base materials and fillers.

An amount of the transesterification catalyst to be used is preferably 0.01 to 50% by weight based on the total weight of the polymer (A) and the polyol (C) to be used as necessary as detailed below. Within such a range, it is preferable in that good curing reaction can be carried out at low temperature. The upper limit is more preferably 10% by weight, and still more preferably 5% by weight.

In the thermosetting resin composition of the present invention, it is preferable that the molar ratio of (meth) acrylic acid tertiary alkyl ester group/hydroxyl group in the composition is in the range of 50/1 to 1/50. However, considering only the crosslinking reaction, it is preferable that the ratio is close to the equivalent amount of 0.1/1 to 1/0.5, or it is slightly excess of the hydroxyl group. Considering the adhesion and hydrophilicity of the thermosetting resin, the molar ratio of hydroxyl groups is increased, and in consideration of the hardness and Tg of the thermosetting resin, the molar ratio of the (meth)acrylic acid tertiary alkyl ester group is increased. Here, the number of moles of hydroxyl group is the total amount of one contained in the polymer (A) and one contained in the polyol (C) added as necessary.

The (meth)acrylic acid tertiary alkyl ester group tends to generate a carboxyl group by a hydrolysis reaction. Therefore, if a tertiary alkyl ester group remains in the cured composition, a carboxyl group is generated. The carboxyl group has high polarity and therefore has high hydrophilicity so that the water resistance is deteriorated. For this reason, particularly when the thermosetting resin composition of the present invention is used as a coating material, the molar ratio of the (meth)acrylic acid tertiary alkyl ester group/hydroxyl group is preferably set to 0.1/1 to 1/0.5.

When the polyol (C) is used, the thermosetting resin composition of the present invention is preferable in that the properties of the resulting cured resin can be adjusted depending on the physical properties of the polyol (C). That is, in the fields of coatings and adhesives, in order to obtain desired physical properties as a composition using polyol (C) in combination with a curing agent, the composition of the polyol (C) is generally changed to obtain the desired thermosetting resin composition in wide applications and purposes.

Hereinafter, the polyol (C) that can be used in the present invention will be described in detail.

The thermosetting resin composition of the present, invention may contain a polyol resin (C) having a plurality of hydroxyl groups in the molecule. Such polyol is not particularly limited, and examples thereof include acryl polyol, polyester polyol, polyether polyol, polycarbonate polyol, polyurethane polyol, and the like. Two or more of them may be used at the same time.

Among these, it is particularly preferable to use an acrylic polyol and/or a polyester polyol.

As the acrylic polyol and/or polyester polyol used here, resins widely used in the field of coatings can be used.

These will be described in detail below.

Acrylic Polyol (C-1)

The acrylic polyol is produced, for example, by copolymerizing a hydroxyl group-containing polymerizable unsaturated monomer ($c_1$) and other polymerizable unsaturated monomer ($c_2$) copolymerizable with the above ($c_1$) by a known method. More specifically, there can be mentioned a polymerization method such as a solution polymerization method in an organic solvent, an emulsion polymerization method in water, a miniemulsion polymerization method in water, an aqueous solution polymerization method, or the like.

The hydroxyl group-containing polymerizable unsaturated monomer ($c_1$) is a compound having one or more hydroxyl groups and polymerizable unsaturated bonds respectively in one molecule. The hydroxyl group-containing polymerizable unsaturated monomer ($c_1$) is not particularly limited.

Representative examples of such hydroxyl group-containing vinyl monomers are exemplified below;

- various hydroxyl group-containing vinyl ethers such as 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether or 6-hydroxyhexyl vinyl ether;
- addition reaction products of these various vinyl ethers and ε-caprolactone;
- various hydroxyl group-containing (meth)allyl ethers such as 2-hydroxyethyl (meth)allyl ether, 3-hydroxypropyl (meth)allyl ether, 2-hydroxypropyl (meth)allyl ether, 4-hydroxybutyl (meth)allyl ether, 3-hydroxybutyl (meth)allyl ether, 2-hydroxy-2-methylpropyl (meth)allyl ether, 5-hydroxypentyl (meth)allyl ether or 6-hydroxyhexyl (meth)allyl ether;
- addition reaction products of these various allyl ethers and ε-caprolactone;
- various hydroxyl group-containing (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, polyethylene glycol mono (meth) acrylate or polypropylene glycol mono (meth)acrylate; or
- main components of addition reaction of these various (meth)acrylates and ε-caprolactone.

Examples of the other polymerizable unsaturated monomer ($c_2$) copolymerizable with the hydroxyl group-containing polymerizable unsaturated monomer ($c_1$) include the following monomers (i) to (xix), and the like, and any combination thereof.

(i) Alkyl or cycloalkyl (meth)acrylate:
methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth) acrylate, 2-ethylhexyl (meth)acrylate, nonyl (meth) acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate, tricyclodecanyl (meth)acrylate, etc.

(ii) Polymerizable unsaturated monomer having an isobornyl group:
isobornyl (meth)acrylate, etc.

(iii) Polymerizable unsaturated monomer having an adamantyl group:
adamantyl (meth)acrylate, etc.

(iv) Polymerizable unsaturated monomer having a tricyclodecenyl group:
tricyclodecenyl (meth)acrylate, etc.

(v) Aromatic ring-containing polymerizable unsaturated, monomer:
benzyl (meth) acrylate, styrene, α-methylstyrene, vinyltoluene, etc.

(vi) Polymerizable unsaturated monomer having an alkoxysilyl group:
vinyltrimethoxysilane, vinyltriethoxysilane, vinyltris(2-methoxyethoxy) silane, γ-(meth)acryloyloxypropyltrimethoxysilane, γ-(meth)acryloyloxypropyltriethoxysilane, etc.

(vii) Polymerizable unsaturated monomer having a fluorinated alkyl group:
perfluoroalkyl (meth)acrylates such as perfluorobutyl ethyl (meth)acrylate and perfluorooctylethyl (meth) acrylate; fluoroolefins, etc.

(viii) Polymerizable unsaturated monomer having a photopolymerizable functional group such as a maleimide group.

(ix) Vinyl compound:
N-vinyl pyrrolidone, ethylene, butadiene, chloroprene, vinyl propionate, vinyl acetate etc.

(x) Carboxyl group-containing polymerizable unsaturated monomer:
(meth)acrylic acid, maleic acid, crotonic acid, β-carboxyethyl acrylate, etc.

(xi) Nitrogen-containing polymerizable unsaturated monomer:
(meth)acrylonitrile, (meth)acrylamide, N, N-dimethylaminoethyl (meth)acrylate, N, N-diethylaminoethyl (meth)acrylate, N, N-dimethylaminopropyl (meth) acrylamide, methylene bis (meth)acrylamide, ethylenebis (meth)acrylamide, adducts of glycidyl (meth)acrylate and an amine compound, etc.

(xii) Polymerizable unsaturated monomer having two or more polymerizable unsaturated groups in one molecule:
allyl (meth)acrylate, 1,6-hexanediol di(meth)acrylate, etc.

(xiii) Epoxy group-containing polymerizable unsaturated monomer:
glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, etc.

(xiv) (Meth)acrylate having a polyoxyethylene chain whose molecular terminal is an alkoxy group:

(xv) Polymerizable unsaturated monomer having a sulfonic acid group:
2-acrylamido-2-methylpropanesulfonic acid, 2-sulfoethyl (meth)acrylate, allylsulfonic acid, 4-styrenesulfonic acid and the like; sodium salts and ammonium salts etc. of these sulfonic acids.

(xvi) Polymerizable unsaturated monomer having a phosphoric acid group:
acid phosphoxyethyl (meth)acrylate, acid phosphoxypropyl (meth)acrylate, acid phosphoxy poly(oxyethylene) glycol (meth)acrylate, acid phosphoxy poly (oxypropylene)glycol (meth)acrylate, etc.

(xvii) Polymerizable unsaturated monomer having an ultraviolet absorbing functional group:

2-hydroxy-4-(3-methacryloyloxy-2-hydroxypropoxy) benzophenone, 2-hydroxy-4-(3-acryloyloxy-2-hydroxypropoxy) benzophenone, 2,2'-dihydroxy-4-(3-methacryloyloxy-2-hydroxypropoxy) benzophenone, 2,2'-dihydroxy-4-(3-acryloyloxy-2-hydroxypropoxy) benzophenone, 2-(2'-hydroxy-5'-methacryloyloxyethylphenyl)-2H-benzotriazole, etc.

(xviii) Ultraviolet stable polymerizable unsaturated monomer:

4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine and the like.

(xix) Polymerizable unsaturated monomer having a carbonyl group:

acrolein, diacetone acrylamide, diacetone methacrylamide, acetoacetoxyethyl methacrylate, formylstyrene, vinyl alkyl ketone having about 4 to about 7 carbon atoms (for example, vinyl methyl ketone, vinyl ethyl ketone, vinyl butyl ketone), and etc.

In the present specification, "polymerizable unsaturated group" means an unsaturated group capable of radical polymerization or ionic polymerization. Examples of the polymerizable unsaturated group include a vinyl group and a (meth)acryloyl group.

The proportion of the hydroxyl group-containing polymerizable unsaturated monomer ($c_1$) in preparing the acrylic polyol (C-1) is preferably 0.5 to 50% by weight based on the total amount of the monomer components. Within such a range, an appropriate cross linking reaction can be caused, and excellent coating film physical properties can be obtained.

The lower limit is more preferably 1.0% by weight, and still more preferably 5% by weight. The upper limit is more preferably 50% by weight, and still more preferably 40% by weight.

The hydroxyl value of the acrylic polyol (C-1) is preferably 1 to 200 mg KOH/g from the viewpoint of water resistance of the formed coating film and the like. The lower limit is more preferably 2 mg KOH/g, and still more preferably 5 mg KOH/g. The upper limit is more preferably 180 mg KOH/g, and still more preferably 170 mg KOH/g.

As the acrylic polyol (C-1), commercially available one can also be used. Commercial ones are not particularly limited, and for example, ACRYDIC A-801-P, A-817, A-837, A-848-RN, A-814, 57-773, A-829, 55-129, 49-394-IM, A-875-55, A-870, A-871, A-859-B, 52-668-BA, WZU-591, WXU-880, BL-616, CL-1000, CL-408, and the like manufactured by DIG Corporation.

The thermosetting coating of the present invention preferably contains the acrylic polyol (C-1) in a proportion of 0.5 to 95% by weight based on the total amount of the acrylic polyol (C-1) and the polymer (A). Within such a range, excellent coating film performance can be preferably obtained.

In the thermosetting coating of the present invention, the ester group in the polymer (A) is preferably 10 to 200% (number ratio) relative to the number of hydroxyl groups derived from the acrylic polyol (C-1).

Polyester Polyol (C-2)

The polyester polyol (C-2) can usually be produced by an esterification reaction or a transesterification reaction of an acid component and an alcohol component. As the above-mentioned acid component, a compound which is ordinarily used as an acid component in the production of a polyester resin can be mentioned. Examples of the acid component include aliphatic polybasic acids, alicyclic polybasic acids, aromatic polybasic acids and the like, and anhydrides and esterified products thereof.

As the above aliphatic polybasic acid, and anhydride and esterified product thereof, aliphatic compounds having two or more carboxyl groups in one molecule, an acid anhydride of the aliphatic compound and an esterified product of the aliphatic compound are generally mentioned, for example, aliphatic polyvalent carboxylic acids such as succinic acid, glutaric acid, adipic acid, pimelic acid, suberic acid, azelaic acid, sebacic acid, undecane diacid, dodecanedioic acid, brassylic acid, octadecanedioic acid, citric acid, and butanetetracarboxylic acid; anhydrides of the above aliphatic polyvalent carboxylic acids;

esterified products of lower alkyl having about 1 to about 4 carbon atoms of the aliphatic polyvalent carboxylic acid, and the like, and any combinations thereof may be mentioned.

The aliphatic polybasic acid is preferably adipic acid and/or adipic anhydride from the viewpoint of the smoothness of the coating film to be obtained.

The above-mentioned alicyclic polybasic acids, and their anhydrides and esterified products are generally compounds having one or more alicyclic structures and two or more carboxyl groups in one molecule, acid anhydrides of the above compounds and esterified products of the above compounds. The alicyclic structure is mainly a 4- to 6-membered ring structure. Examples of the alicyclic polybasic acid and anhydride and esterified product thereof include the alicyclic polyvalent carboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid, 1,3,5-cyclohexanetricarboxylic acid and the like; anhydrides of the alicyclic polyvalent carboxylic acids; esterified products of the lower alkyl having about 1 to about 4 carbon atoms of the alicyclic polyvalent carboxylic acid, and the like; and any combinations thereof may be mentioned.

From the viewpoint of the smoothness of the coating film to be obtained, it is preferable to use 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid and 4-cyclohexene-1,2-dicarboxylic anhydride, and 1,2-cyclohexane dicarboxylic acid and/or 1,2-cyclohexanedicarboxylic anhydride is more preferable.

The above aromatic polybasic acid and their anhydride and esterified product may generally include aromatic polyvalent carboxylic acids such as an aromatic compound having two or more carboxyl groups in one molecule, an acid anhydride of the aromatic compound and an esterified product of the aromatic compound including phthalic acid, isophtnaiic acid, terephthalic acid, naphthalene dicarboxylic acid, 4,4'-biphenyl dicarboxylic acid, trimellitic acid, pyromellitic acid and the like; acid anhydride of the aromatic polyvalent carboxylic acid, esterified products of lower alkyl having about 1 to about 4 carbon atoms of the aromatic polyvalent carboxylic acid, and the like, and any combinations thereof. As the above aromatic polybasic acid and their anhydride and esterified product, phthalic acid, phthalic anhydride, isophthalic acid, trimellitic acid, and trimellitic anhydride are preferable.

Further, as the acid component, acid components other than the aliphatic polybasic acid, the alicyclic polybasic acid and the aromatic polybasic acid, for example, fatty acids such as coconut oil fatty acid, cottonseed oil fatty acid, hemp oil fatty acid, rice bran oil fatty acid, fish oil fatty acid, Tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid etc.; monocarboxylic acids such as lauric acid, myristic acid, palmitic acid, stearic acid, oleic acid acid, linoleic acid, linolenic acid, benzoic acid, p-tert-butylbenzoic acid, cyclohexanoic acid, 10-phenyloctadecanoic acid and the like;

hydroxy carboxylic acids such as lactic acid, 3-hydroxybutanoic acid, 3-hydroxy-4-ethoxybenzoic acid, and the like, and any combination thereof may be mentioned.

As the alcohol component, a polyhydric alcohol having two or more hydroxyl groups in one molecule may be used. The polyhydric alcohol may include, for example, dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butane diol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydroxypivalic acid neopentyl glycol ester, hydrogenated bisphenol A, hydrogenated bisphenol F, and dimethylolpropionic acid;

polylactone diol obtained by adding a lactone compound such as ε-caprolactone to the dihydric alcohol; ester diol compounds such as bis (hydroxyethyl) terephthalate;

polyether diol compounds such as alkylene oxide adducts of bisphenol A, polyethylene glycol, polypropylene glycol and polybutylene glycol;

trihydric or higher alcohol such as glycerin, trimethylolethane, trimethylolpropane, diglycerin, triglycerin, 1,2,6-hexanetriol, pentaerythritol, dipentaerythritol, tris (2-hydroxyethyl) isocyanuric acid, sorbitol, and mannitol;

a polylactone polyol compound obtained by adding a lactone compound such as ε-caprolactone to the trihydric or higher alcohol;

fatty acid, esterified products of glycerin, and the like.

As the above-mentioned alcohol component, an alcohol component other than the polyhydric alcohol, for example, a monoalcohol such as methanol, ethanol, propyl alcohol, butyl alcohol, stearyl alcohol or 2-phenoxyethanol; and an alcohol compound obtained by reacting a monoepoxy compound such as propylene oxide, butylene oxide, "Cardura E10" (trade name, glycidyl esters of synthetic hyperbranched saturated fatty acids, manufactured by HEXION Specialty Chemicals, Inc.) with an acid may be used.

The polyester polyol (C-2) is not particularly limited, and it can be produced by a usual method. For example, the acid component and the alcohol component are heated in a nitrogen stream at about 150 to about 250° C. for about 5 to about 10 hours to carry out esterification reaction or transesterification reaction of the acid component and the alcohol component, thereby the polyester polyol (B-2) can be produced.

The polyol (C) of the present invention may contain both polyacrylic polyol (C-1) and polyester polyol (C-2) in combination.

The thermosetting coating of the present invention preferably contains the polyol (C) in a proportion of 5 to 95% by weight based on the total amount of the polyol (C) and the polymer (A). Within such a range, excellent coating film performance can be preferably obtained.

In the thermosetting coating of the present invention, the ester group in the polymer (A) is preferably 10 to 200% (number ratio) relative to the number of hydroxyl groups derived from the polyol (C).

In the case where the thermosetting resin composition of the present invention contains a polyol resin (C) having two or more hydroxyl groups, there is an advantage that a resin that has been used in a conventional thermosetting resin composition using a polyisocyanate curing agent or a melamine resin can be used as a polyol resin.

In this way, when used in combination with the polyol resin (C) having a plurality of hydroxyl groups in the molecule, the polymer (A) preferably contains a tertiary alkyl (meth)acrylate in a proportion of 1 to 100 mol % on the basis of the structural unit of the polymer. That is, it is preferable to use the polymer containing the tertiary alkyl (meth)acrylate in a high proportion as described above, since a sufficient crosslinking density can be obtained.

When used in combination with a polyol resin (C) having a plurality of hydroxyl groups in the molecule, the polymer (A) preferably has a number average molecular weight of 1,000 to 100,000, and more preferably 1,000 to 50,000. That is, it is preferred that the molecular weight is relatively low because the viscosity is lowered, which increases the miscibility between the polymer (A) and the polyol resin (C).

The form of the thermosetting resin composition of the present invention is an organic solvent-type form or a water-borne form. This is preferable in that thin film coating can be performed and low-temperature curing can be performed. The water-borne system may be water-soluble or water-dispersible, and it may contain an aqueous solvent that can be mixed with water at an arbitrary ratio such as ethanol, methanol, alcohol type, glycol type, ether type, ketone type or the like in addition to water.

The organic solvent-type thermosetting resin composition is a composition in which the above components are dissolved or dispersed in various organic solvents. The organic solvent that can be used is not particularly limited, and examples thereof include hydrocarbons such as 1-hexane, 1-octane, 1-decane, 1-tetradecane, cyclohexane, benzene and xylene, ethers such as dimethyl ether and diethyl ether, ketones such as acetone, methyl ethyl ketone, and cyclohexanone, chlorinated hydrocarbons such as trichloromethane, carbon tetrachloride, dichloroethane, trichloroethane, tetrachloroethylene and the like, and any known ones such as ethanol, methanol, propanol, butanol, acetone, and the like.

Further, as a two-component resin composition, a curing agent solution containing the polymer (A) and a base solution containing the polyol (C) may be combined and used by mixing them immediately before use.

The thermosetting composition of the present invention may further be used in combination with other crosslinking agents commonly used in the fields of coatings and adhesives. The crosslinking agent that can be used is not particularly limited, and examples thereof include an isocyanate compound, a blocked isocyanate compound, a melamine resin, an epoxy resin, a silane compound, and the like. In addition, vinyl ether, radical polymerizable monomer, etc, may be used in combination, A curing catalyst or a curing aid for accelerating the reaction of the used crosslinking agent may be used in combination. When a radical polymerizable compound is used in combination, a photopolymerization initiator, a thermal polymerization initiator and the like may be used in combination.

When the crosslinking agent commonly used in the fields of coatings and adhesives is used in combination, the content thereof is preferably within the range of 0.01 to 50% by weight relative to the total weight of the crosslinking agent, the polymer (A), and the polyol resin (C). The lower limit is more preferably 0.01% by weight, and still more preferably 1% by weight. The upper limit is more preferably 30% by weight, and still more preferably 10%.

The above-mentioned other crosslinking agent is not indispensable, and even if the thermosetting resin composition of the present invention does not contain it, it is preferable from the viewpoint that good curability can be obtained.

The thermosetting resin composition of the present invention may contain a nonaqueous dispersion resin (NAD) when necessary according to the purpose. However, the nonaqueous dispersion resin (NAD) is not indispensable and may not contain it.

The thermosetting resin composition of the present invention can be suitably used in the fields of thermosetting coatings, thermosetting adhesives and the like.

When it is used as a thermosetting coating material, in addition to each of the above-described components, additives commonly used in the coating material field may be used in combination. For example, coloring pigments, extender pigments, bright pigments and the like, and any combination thereof may be used in combination.

When a pigment is used, it is preferably contained in a total amount of 1 to 500% by weight, based on 100% by weight of the total solid content of the resin component. The lower limit is more preferably 3% by weight, and still more preferably 5 parts by weight. The upper limit is more preferably 400% by weight, and still more preferably 300% by weight.

Examples of the coloring pigment include titanium oxide, zinc white, carbon black, molybdenum red, prussian blue, cobalt blue, azo pigment, phthalocyanine pigment, quinacridone pigment, isoindoline pigment, threne pigment, perylene pigment, dioxazine type pigment, diketopyrrolopyrrole type pigment, and the like, and any combination thereof.

Examples of the extender pigment include clay, kaolin, barium sulfate, barium carbonate, calcium carbonate, talc, silica, alumina white and the like, and barium sulfate and/or talc is preferable, and barium, sulfate is more preferable.

Examples of the bright pigment include, for example, aluminum oxide coated with aluminum (including vapor-deposited aluminum), copper, sine, brass, nickel, aluminum oxide, mica, titanium oxide or iron oxide, mica coated with titanium oxide or iron oxide, glass flakes, hologram pigments, etc., and any combinations thereof. The aluminum pigment includes nonleafing type aluminum and leafing type aluminum.

If desired, the thermosetting coating may further contain an additive for coating such as a thickener, an ultraviolet absorber, a light stabilizer, an antifoaming agent, a plasticizer, an organic solvent other than the hydrophobic solvent, a surface conditioner, an anti-settling agent, and the like.

Examples of the thickener include inorganic thickeners such as silicate, metal silicate, montmorillonite, colloidal alumina and the like; polyacrylic acid thickeners such as copolymers of (meth)acrylic acid and (meth)acrylic acid ester, and sodium polyacrylate;

associative type thickener having a hydrophilic part and a hydrophobic part in one molecule and showing a thickening effect by an adsorption of the hydrophobic portion on the surface of the pigment or emulsion particle in the coating, or an association of the hydrophobic parts, in an aqueous medium;

cellulose derivative thickeners such as carboxymethylcellulose, methylcellulose, hydroxyethylcellulose and the like;

protein type thickeners such as casein, sodium caseinate, ammonium caseinate and the like alginic acid thickeners such as sodium alginate;

polyvinyl thickeners such as polyvinyl alcohol, polyvinyl pyrrolidone, polyvinyl benzyl ether copolymers;

polyether thickeners such as pluronic polyethers, polyether dialkyl esters, polyether dialkyl ethers, polyether epoxy modified products and the like;

maleic anhydride copolymer type thickener such as a partial ester of vinyl methyl ether-maleic anhydride copolymer;

polyamide type thickeners such as a polyamide amine salt, etc., and any combination thereof.

The polyacrylic acid thickener is commercially available, and examples thereof include "ACRYSOLASE-60", "ACRYSOLTT-615", and "ACRYSOLRM-5" (trade names) manufactured by Rohm and Haas Company, and "SN Thickener 613", "SN Thickener 618", "SN Thickener 630", "SN Thickener 634", and "SN Thickener 636" (trade names) manufactured by San Nopco CO., LTD.

The associative type thickener is commercially available, and examples thereof include "UH-420", "UH-450", "UH-462", "UH-472", "UH-540", "UH-752", "UH-756VF", and "UH-814N" (trade names) manufactured by ADEKA Corporation, "ACRYSOLRM-8W", "ACRYSOLRM-825", "ACRYSOLRM-2020NPR", "ACRYSOLRM-12W", and "ACRYSOLSCT-275" (trade names) manufactured by Rohm and Haas Company, "SN Thickner 612", "SN Thickener 621 N", "SN Thickener 625 N", "SN Thickener 627 N", and "SN Thickener 660 T" (trade names) manufactured by SAN NOPCO CO., LTD. and the like.

The object to which the thermosetting coating can be applied is not particularly limited, and examples thereof include an outer plate portion of an automobile body such as a passenger car, a truck, a motorcycle, and a bus; an automobile part; house electrical products such as a mobile phone, an audio device, etc., building materials, furniture, adhesives, film and glass coating agents, and the like. When used as an automotive coating, it can be used for the effect of an arbitrary layer such as an intermediate coating, a base coating and a clear coating.

The object to be coated may be one obtained by applying a surface treatment such as a phosphate treatment, a chromate treatment, a composite oxide treatment or the like to the metal surface of the metal material and a car body molded therefrom, or may be a substrate to be coated having a coating film.

As the above substrate to be coated having the coating film, there can be mentioned a substrate which is subjected to a surface treatment as desired and has an undercoating film formed thereon. In particular, a car body having an undercoating film formed by an electrodeposition coating is preferable, and a car body having an undercoating film formed by a cationic electrodeposition coating is more preferable.

The substrate to be coated may be one obtained by subjecting the surface of plastic such as plastic material and automobile part molded therefrom to surface treatment, primer coating or the like as desired. Further, the plastic material and the metal material may be combined.

The method of applying the thermosetting coating is not particularly limited, and examples thereof include an air spray coating, an airless spray coating, a rotary atomization coating, a curtain coating and the like, and air spray coating, rotary atomization coating, and the like are preferable. At the time of coating, electrostatic application may be performed if desired. By the above coating method, a wet coating film can be formed from the water-borne coating composition.

The wet coating film can be cured by heating. The curing can be carried out by a known heating means, for example, a drying oven such as an air-heating furnace, an electric furnace, an infrared induction heating furnace or the like. The wet coating film is preferably cured by heating at a temperature in the range of about 80 to about 180° C., more preferably about 100 to about 170° C., and even more preferably about 120 to about 160° C., and preferably for about 10 to about 60 minutes, and more preferably for about 15 to about 40 minutes. It is also preferable in that it can cope with low temperature curing at 80 to 140° C. The present invention is also a cured film cured in this way.

EXAMPLES

Hereinafter, the present disclosure will be explained with reference to examples. However, the present disclosure is not limited to these examples. In addition, "part(s)" means "part(s) by weight" in the examples.

Synthesis Example 1 (Production of Resin for Comparative Example)

N-butyl methacrylate (Kyoeisha Chemical Co., Ltd., Light Ester NB) 240 parts, 110 parts of hydroxyethyl methacrylate (Kyoeisha Chemical Co., Ltd., Light Ester HO-250) and 30 parts of styrene were mixed to prepare a monomer mixture solution, and 19 parts of 2,2'-azobis (2,4-dimethylvaleronitrile) (Sako Pure Chemical Industries, V-65) as an initiator was dissolved in an aromatic hydrocarbon (T-SOL 100) to prepare an initiator solution. Aromatic hydrocarbon (T-SOL 100) 190 parts and 190 parts of cyclohexanone were placed in a stirrable flask, and the monomer solution and the initiator solution were added dropwise while nitrogen was enclosed. The polymerization temperature at this time was 100° C. The dropwise addition was carried out for 2 hours, and further aging was carried out at 100° C. for 4 hours to obtain a comparative polymer solution A.

Synthesis Example 2

N-butyl methacrylate (Kyoeisha Chemical Co., Ltd., Light Ester KB) 240 parts, 120 parts of t-butyl methacrylate (Kyoeisha Chemical Co., Ltd., Light Ester TB), 110 parts of hydroxyethyl methacrylate (Kyoeisha Chemical Co., Ltd., Light Ester HO-250) and 30 parts of styrene were mixed to prepare a monomer mixture solution, and 25 parts of 2,2'-azobis (2,4-dimethylvaleronitrile) (Wako Pure Chemical Industries, V-65) as an initiator was dissolved in an aromatic hydrocarbon (T-SOL 100) to prepare an initiator solution.

Aromatic hydrocarbon (T-SOL 100) 250 parts and 250 parts of cyclohexanone were placed in a stirrable flask, and the monomer solution and the initiator solution were added dropwise while nitrogen was enclosed. The polymerization temperature at this time was 100° C. The dropwise addition was carried out for 2 hours, and further aging was carried out at 100° C. for 4 hours to obtain a polymer solution B.

Synthesis Example 3

N-butyl methacrylate (Kyoeisha Chemical Co., Ltd., Light Ester NB) 245 parts, 110 parts of t-butyl acrylate (Kyoeisha Chemical Co., Ltd., Light Acrylate TB), 115 parts of hydroxyethyl methacrylate (Kyoeisha Chemical Co., Ltd., Light Ester HO-250) and 30 parts of styrene were mixed to prepare a monomer mixture solution, and 25 parts of 2,2'-azobis (2,4-dimethylvaleronitrile) (Wako Pure Chemical Industries, V-65) as an initiator was dissolved in an aromatic hydrocarbon (T-SOL 100) to prepare an initiator solution.

Aromatic hydrocarbon (T-SOL 100) 250 parts and 250 parts of cyclohexanone were placed in a stirrable flask, and the monomer solution and the initiator solution were added dropwise while nitrogen was enclosed. The polymerization temperature at this time was 100° C. The dropwise addition was carried out for 2 hours, and further aging was carried out at 100° C. for 4 hours to obtain a polymer solution C.

Synthesis Example 4

N-butyl methacrylate (Kyoeisha Chemical Co., Ltd., Light Ester NB) 240 parts, 105 parts of t-Butyl acrylate (Kyoeisha Chemical Co., Ltd., Light Acrylate TB), 110 parts of hydroxyethyl methacrylate (Kyoeisha Chemical Co., Ltd., Light Ester HO-250), 30 parts of styrene, and 15 parts of reactive emulsifier (DKS Co. Ltd. Aquaron KH-10) were mixed. Then, 200 parts of ion exchanged water was mixed with the obtained solution and emulsification was carried out for 1 hour at room temperature using a homomixer to prepare a monomer emulsion. Ammonium, peroxodisulfate 15 parts and 10 parts of sodium, bisulfite as an initiator were dissolved in ion exchanged water to prepare an initiator solution.

Ion exchanged water 400 parts and 10 parts of isopropyl alcohol were placed in a stirrable flask, and the monomer solution and the initiator solution were added dropwise while nitrogen was enclosed. The polymerization temperature at this time was 80° C. The dropwise addition was carried out for 2 hours, and further aging was carried out at 80° C. for 4 hours to obtain a polymer solution D.

Synthesis Example 5

N-butyl methacrylate (Kyoeisha Chemical Co., Ltd., Light Ester NB) 245 parts, 110 parts of t-butyl acrylate (Kyoeisha Chemical Co., Ltd., Light Acrylate TB), 115 parts of hydroxyethyl methacrylate (Kyoeisha Chemical Co., Ltd., Light Ester HG-250) and 30 parts of styrene were mixed to prepare a monomer mixture solution, and 25 parts of 2,2'-azobis (2,4-dimethylvaleronitrile) (Wako Pure Chemical Industries, V-65) as an initiator was dissolved in diethylene glycol dimethyl ether (Toho Chemical Industry: Hisolv MBM) to prepare an initiator solution. Diethylene glycol dimethyl ether 500 parts was placed in a stirrable flask, and the monomer solution and the initiator solution were added dropwise while nitrogen was enclosed. The polymerization temperature at this time was 100° C. The dropwise addition was carried out for 2 hours, and further aging was carried out at 100° C. for 4 hours to obtain a polymer solution E.

Synthesis Example 6

An additional experiment of the resin composition disclosed in the prior document (Japanese Kokai Publication Hei9-59543) was performed. T-butyl methacrylate (Kyoeisha Chemical Co., Ltd., Light Ester TB) 375 parts, 125 parts of hydroxyethyl methacrylate (Kyoeisha Chemical Co., Ltd., Light Ester HG-250) as a comparative resin were mixed to prepare a monomer mixture solution, and 25 parts of t-butyl peroxyoctoate and 3 parts of 2,2'-azobis (isobutyronitrile) as an initiator were dissolved in xylene to prepare an initiator solution. Xylene 500 parts was placed in a stirrable flask, and the monomer solution and the initiator solution were added dropwise while nitrogen was enclosed. The polymerization temperature at this time was 130° C. The dropwise addition was carried out for 4 hours, and further aging was carried out at 130° C. for 10 hours to obtain a comparative polymer solution F.

Synthesis Example 7

Ethylene glycol monoacetoacetate monomethacrylate 54 parts, 58 parts of t-butyl acrylate, 38 parts of potassium carbonate, 2 parts of 18-crown-6 ether and 112 parts of tetrahydrofuran were mixed and stirred at 50° C. for 3 hours. After completion of the reaction, cyclohexane and water were added and washed with water. The organic layer was neutralized with a saturated aqueous solution of ammonium chloride and washed twice with water, and the obtained organic layer was concentrated under reduced pressure to obtain a monomer A.

Synthesis Example 8

N-butyl methacrylate (Kyoeisha Chemical Co., Ltd., Light Ester KB) 200 parts, 175 parts of monomer A, 90 parts of hydroxyethyl methacrylate (Kyoeisha Chemical Co., Ltd., Light Ester HO-250) and 25 parts of styrene were mixed, to prepare a monomer mixture solution, and 25 parts of 2,2'-azobis (2,4-dimethylvaleronitrile) (Wako Pure Chemical Industries, V-65) as an initiator was dissolved, in an aromatic hydrocarbon (T-SOL 100) to prepare an initiator solution.

Aromatic hydrocarbon (T-SOL 100) 490 parts was placed in a stirrable flask, and the monomer solution and the initiator solution were added dropwise while nitrogen was enclosed. The polymerization temperature at this time was 100° C. The dropwise addition was carried out for 2 hours, and further aging was carried out at 100° C. for 4 hours to obtain a polymer solution G.

Physical properties of the resin obtained by these synthesis examples are shown in the following Table 1.

TABLE 1

|  | Solid content/% | Mn | Mw | Mw/Mn | Tg/° C. |
|---|---|---|---|---|---|
| Comparative polymer solution A | 52 | 5,300 | 9,400 | 1.78 | 34.5 |
| Polymer solution B | 54 | 6,500 | 14,300 | 2.22 | 49.8 |
| Polymer solution C | 52 | 4,600 | 9,100 | 1.98 | 29.8 |
| Polymer solution D | 49 | — | — | — | 29.8 |
| Polymer solution E | 52 | 5,800 | 11,800 | 2.03 | 29.8 |
| Comparative polymer solution F | 50 | 5,000 | 7,800 | 1.56 | 92.5 |
| Polymer solution G | 50 | 4,200 | 14,800 | 3.54 | — |

In Table 1, Mn (number average molecular weight) and Mw (weight average molecular weight) are values of molecular weight as measured by gel permeation chromatography (GPC) in terms of polystyrene. GPC KF-804L (manufactured by Showa Denko KK) was used as the column, and tetrahydrofuran as the solvent.

Comparative Example 1

Zinc acetate was mixed with the comparative polymer solution F so as to be 0.2 wt % relative to the solid content of the comparative polymer solution F. A coating film of 400 μm was formed by WET using an applicator and cured at 150° C. for 20 minutes. Thereafter, the gel fraction, the xylene rubbing test and the water resistance were evaluated.

Comparative Example 2

Zinc acetate was mixed with the comparative polymer solution F so as to be 0.2 wt % relative to the solid content of the comparative polymer solution F. A coating film of 400 μm was formed by WET using an applicator and cured at 170° C. for 20 minutes. Thereafter, the gel fraction, the xylene rubbing test and the water resistance were evaluated and the curability of the prepared liquid was confirmed by a rigid body pendulum test.

Comparative Example 3

Paratoluenesulfonic acid (PTS) was mixed with the comparative polymer solution F so as to be 0.2 wt % relative to the solid content of the comparative polymer solution F. A coating film of 400 μm was formed by WET using an applicator, and cured at 150° C. for 20 minutes. Thereafter, the gel fraction, the xylene rubbing test and the water resistance were evaluated.

Comparative Example 4

Paratoluenesulfonic acid (PTS) was mixed with the comparative polymer solution F so as to be 0.2 wt % relative to the solid, content of the comparative polymer solution F, A coating film of 400 μm was formed by WET using an applicator, and cured at 170° C. for 20 minutes. Thereafter, the gel fraction, the xylene rubbing test and the water resistance were evaluated.

TABLE 2

|  | Compar. Ex. 1 | Compar. Ex. 2 | Compar. Ex. 3 | Compar. Ex. 4 |
|---|---|---|---|---|
| Comparative polymer solution F | 100 | 100 | 100 | 100 |
| Zinc acetate | 0.1 | 0.1 |  |  |
| PTS |  |  | 0.1 | 0.1 |
| Curing temperature | 150° C. | 170° C. | 150° C. | 170° C. |

TABLE 2-continued

Figure 1:
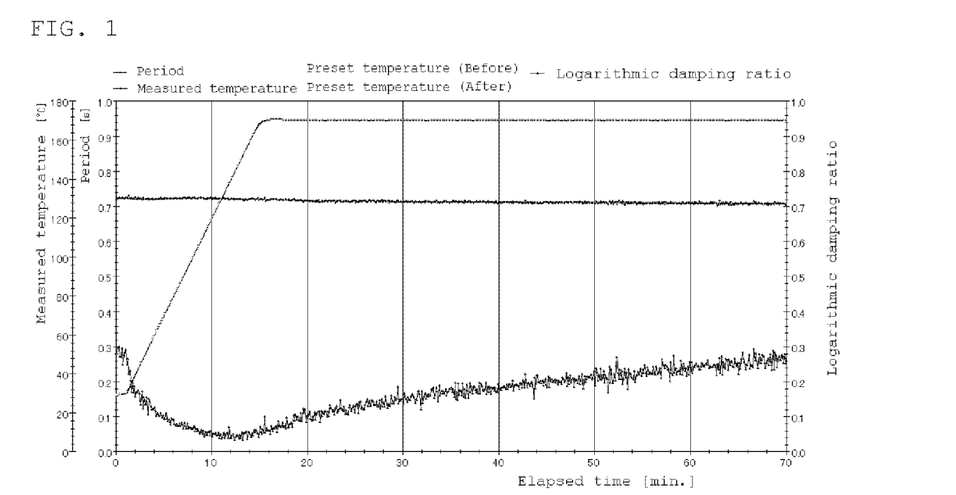
FIG. 1 is a rigid body pendulum data at 170° C. of Comparative Example 2.

|  | Compar. Ex. 1 | Compar. Ex. 2 | Compar. Ex. 3 | Compar. Ex. 4 |
|---|---|---|---|---|
| Curing time | 20 min. | 20 min. | 20 min. | 20 min. |
| Gel fraction/% | 0 | 0 | 0 | 53 |
| Xylene rubbing | x | x | x | x |
| Water resistance | x | x | x | x |
| Rigid body pendulum | | FIG. 1 | | |

Comparative examples 1 to 4 are additional tests for confirming the prior document (Japanese Kokai Publication Hei9-59543), but the gel fraction did not result in reported, results.

Moreover, the result of evaluation of the water resistance was bad in each case.

From the above results, it is obvious that the method of Patent Document 1 does not achieve sufficient curing performance and water resistance when applied to solvent-type and water-borne thermosetting resin compositions.

Comparative Example 5

Phenolsulfonic acid (PHS) was mixed, with polymer solution A so as to be 2 wt % relative to the solid content of comparative polymer solution A, a coating film of 400 μm was formed by WET using an applicator, and cured at 140° C. for 30 minutes. Thereafter, the gel fraction, the xylene rubbing test and the water resistance were evaluated and the curability of the prepared liquid was confirmed by a rigid body pendulum test.

Example 1

Dodecylbenzenesulfonic acid (BBS) was mixed with the polymer solution B so as to be 3 wt % relative to the solid content of the polymer solution B. A coating film of 400 μm was formed by WET using an applicator and cured at 140° C. for 30 minutes. Thereafter, the gel fraction, the xylene rubbing test and the water resistance were evaluated and the curability of the prepared liquid was confirmed by a rigid body pendulum test.

Example 2

Dodecylbenzenesulfonic acid (DBS) was mixed with the polymer solution B so as to be 3 wt % relative to the solid content of the polymer solution B, a coating film of 400 μm was formed by WET using an applicator, and cured at 160° C. for 30 minutes. Thereafter, the gel fraction, the xylene rubbing test and the water resistance were evaluated and the curability of the prepared liquid was confirmed by a rigid body pendulum test.

Example 3

Dodecylbenzenesulfonic acid (BBS) was mixed with the polymer solution C so as to be 3 wt % relative to the solid content of the polymer solution C. A coating film of 400 μm was formed by WET using an applicator, and cured at 140° C. for 30 minutes. Thereafter, the gel fraction, the xylene rubbing test and the water resistance were evaluated and the curability of the prepared liquid was confirmed by a rigid body pendulum test.

Example 4

Doaecylbenzenesulfonic acid (DBS) was mixed with the polymer solution C so as to be 3 wt % relative to the solid content of the polymer solution C. A coating film of 400 μm was formed by WET using an applicator, and cured at 160° C. for 30 minutes. Thereafter, the gel fraction, the xylene rubbing test and the water resistance were evaluated and the curability of the prepared liquid was confirmed by a rigid body pendulum test.

Example 5

Methane sulfonic acid (MSA) was mixed with polymer solution C so as to be 3 wt % relative to the solid content of polymer solution C, a coating film of 400 μm was formed by WET using an applicator, and curing was performed at 140° C. for 30 minutes. Thereafter, the gel fraction, the xylene rubbing test and the water resistance were evaluated and the curability of the prepared liquid was confirmed by a rigid body pendulum test.

Example 6

A coating film of the polymer solution D of 400 μm was formed by WET using an applicator and cured at 140° C. for 30 minutes. Thereafter, gel fraction, xylene rubbing test and water resistance were evaluated.

Example 7

Methane sulfonic acid (MSA) was mixed with polymer solution D so as to be 3 wt % relative to the solid content of the polymer solution. A coating film of 400 μm was formed by WET using an applicator, and cured at 140° C. for 30 minutes. Thereafter, the gel fraction, the xylene rubbing test and the water resistance were evaluated and the curability of the prepared liquid was confirmed by a rigid body pendulum test.

Example 8

To 100 parts of the polymer solution E, 10 parts of ion exchanged water was added, further methanesulfonic acid (MSA) was mixed so as to be 3 wt % relative to the solid content of the polymer solution. A coating film of 400 μm was formed by WET using an applicator, and cured at 140° C. for 30 minutes. Thereafter, the gel fraction, the xylene rubbing test and the water resistance were evaluated and the curability of the prepared liquid was confirmed by a rigid body pendulum test.

Example 9

To 100 parts of the polymer solution C, 10 parts of a blocked isocyanate (Duranate MF-K 60 B manufactured by Asahi Kasei Corporation) was added, further dodecylbenzene sulfonic acid (DBS) were mixed so as to be 3 wt % relative to the solid content of the polymer solution. A coating film of 400 μm was formed by WET using an applicator, and cured at 140° C. for 30 minutes. Thereafter, the gel fraction, the xylene rubbing test and the water resistance were evaluated and the curability of the prepared liquid was confirmed by a rigid body pendulum test.

Example 10

Phenolsulfonic acid (PHS) was mixed with polymer solution G so as to be 2 wt % relative to the solid content of polymer solution, a coating film of 400 μm was formed by WET using an applicator, and cured at 140° C. for 30 minutes. Thereafter, the gel fraction, the xylene rubbing test and the water resistance were evaluated and the curability of the prepared liquid was confirmed by a rigid body pendulum test.

Example 11

Phenolsulfonic acid (PHS) was mixed with polymer solution G so as to be 2 wt % relative to the solid content of polymer solution, a coating film of 400 μm was formed by WET using an applicator, and cured at 120° C. for 30 minutes. Thereafter, the gel fraction, the xylene rubbing test and the water resistance were evaluated and the curability of the prepared liquid was confirmed by a rigid body pendulum test.

TABLE 3

Figure 2:
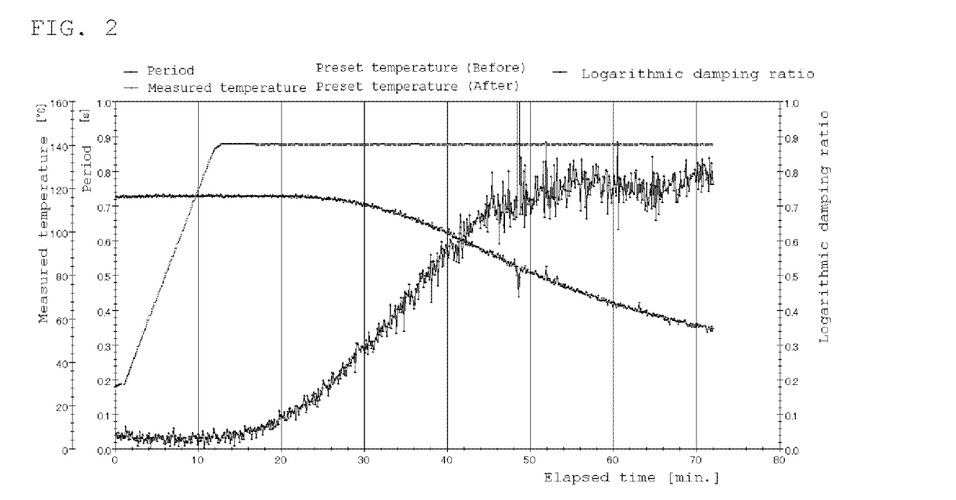
FIG. 2 is a rigid body pendulum data at 140° C. of Comparative Example 5.
Figure 3:
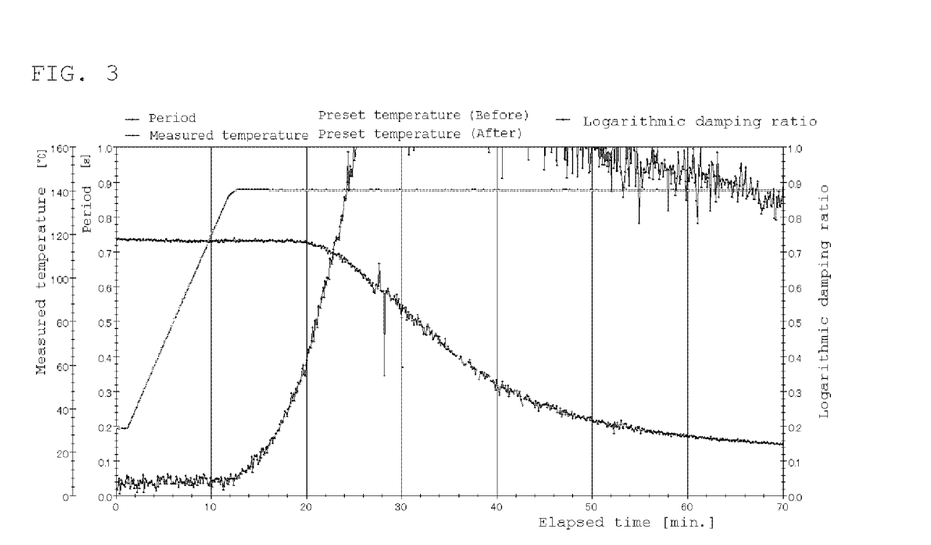
FIG. 3 is a rigid body pendulum data at 140° C. of Example 3.
Figure 4:
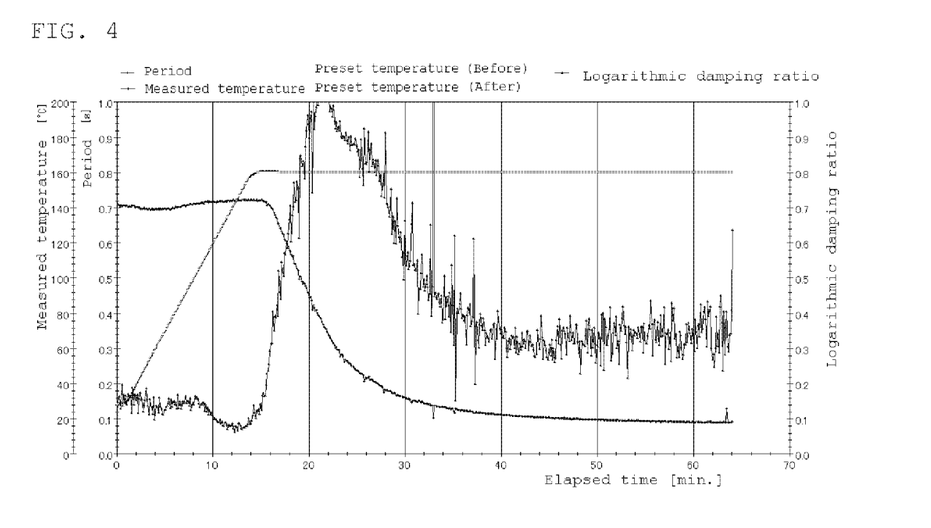
FIG. 4 is a rigid body pendulum data at 160° C. of Example 4.
Figure 5:
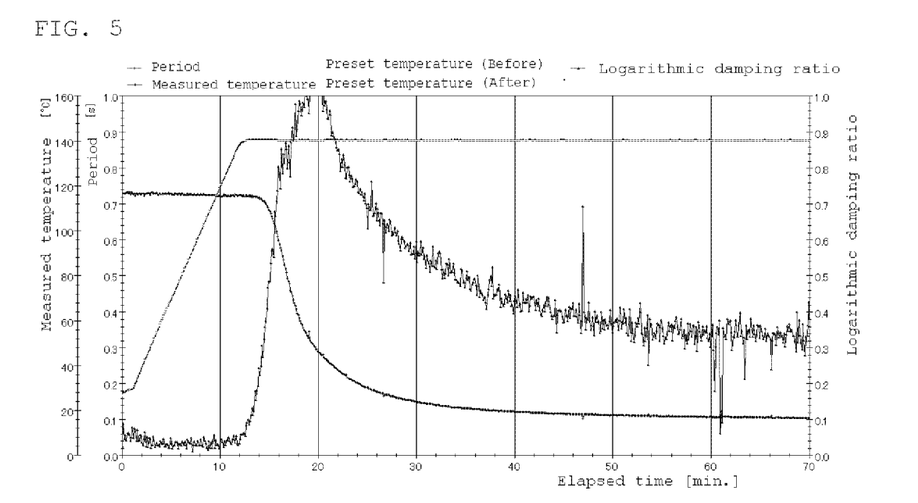
FIG. 5 is a rigid body pendulum data at 140° C. of Example 6.

|  | Compar. Ex. 5 | Ex. 1 | Ex. 2 | Ex. 3 | Ex. 4 | Ex. 5 |
| --- | --- | --- | --- | --- | --- | --- |
| Comparative polymer solution A | 100 | | | | | |
| Polymer solution B | | 100 | 100 | | | |
| Polymer solution C | | | | 100 | 100 | 100 |
| PHS | 1.0 | | | | | |
| DBS | | 1.5 | 1.5 | 1.5 | 1.5 | |
| MSA | | | | | | 1.5 |
| Curing temperature | 140° C. | 140° C. | 160° C. | 140° C. | 160° C. | 140° C. |
| Curing time | 30 min. | 30 min. | 30 min. | 30 min. | 30 min. | 30 min. |
| Gel fraction/% | 89 | 80 | 92 | 96 | 97 | 88 |
| Xylene rubbing | X | ○ | ○ | ○ | ○ | ○ |
| Water resistance | ○ | X | X | ○ | ○ | ○ |
| Rigid body pendulum. | FIG. 2 | | | FIG. 3 | FIG. 4 | FIG. 5 |

As mentioned above, curing by transesterification reaction can be carried out with primary esters, but since xylene rubbing is poor, although the reaction proceeds, it cannot be said that the coating film performance is satisfactory.

The crosslinking reaction can be improved by containing a tertiary ester improves and further improved by using a tertiary butyl acrylate having a lower Tg.

TABLE 4

Figure 6:
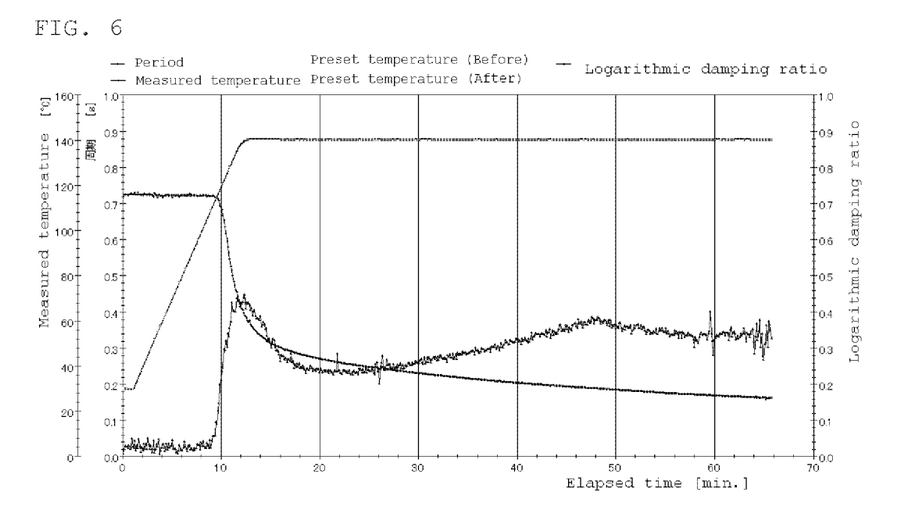
FIG. 6 is a rigid body pendulum data at 140° C. of Example 9.

|  | Ex. 6 | Ex. 7 | Ex. 8 | Ex. 9 |
| --- | --- | --- | --- | --- |
| Polymer solution C | | | | 100 |
| Polymer solution D | 100 | 100 | | |
| Polymer solution E | | | 100 | |
| Ion exchanged water | | | 10 | |
| Blocked isocyanate | | | | 10 |
| MSA | | 1.5 | 1.5 | |
| DBS | | | | 1.5 |
| Curing temperature | 140° C. | 140° C. | 140° C. | 140° C. |
| Curing time | 30 min. | 30 min. | 30 min. | 30 min. |
| Gel fraction/% | 97 | 99 | 99 | 98 |
| Xylene rubbing | ○ | ○ | ○ | ○ |
| Water resistance | Δ | ○ | ○ | ○ |
| Rigid body pendulum | | | | FIG. 6 |

* Duranate MF-K 60 B manufactured by Asahi Kasei Corporation was used as the blocked isocyanate.

Good results are obtained, also in Examples 6 to 3, and crosslinking in an aqueous system is also possible. Also, in Example 6, no transesterification catalyst is added, but the sulfate ester ammonium salt contained, in the reactive emulsifier acts preferably as a catalyst, and it is also possible to introduce the transesterification catalyst into the molecular chain.

TABLE 5

|  | Example 10 | Example 11 |
| --- | --- | --- |
| Polymer solution G | 100 | 100 |
| PHS | 1 | 1 |
| Curing temperature | 140° C. | 120° C. |
| Curing time | 30 minutes | 30 minutes |
| Gel fraction/% | 96 | 88 |
| Xylene rubbing | ○ | ○ |

TABLE 5-continued

Figure 7:
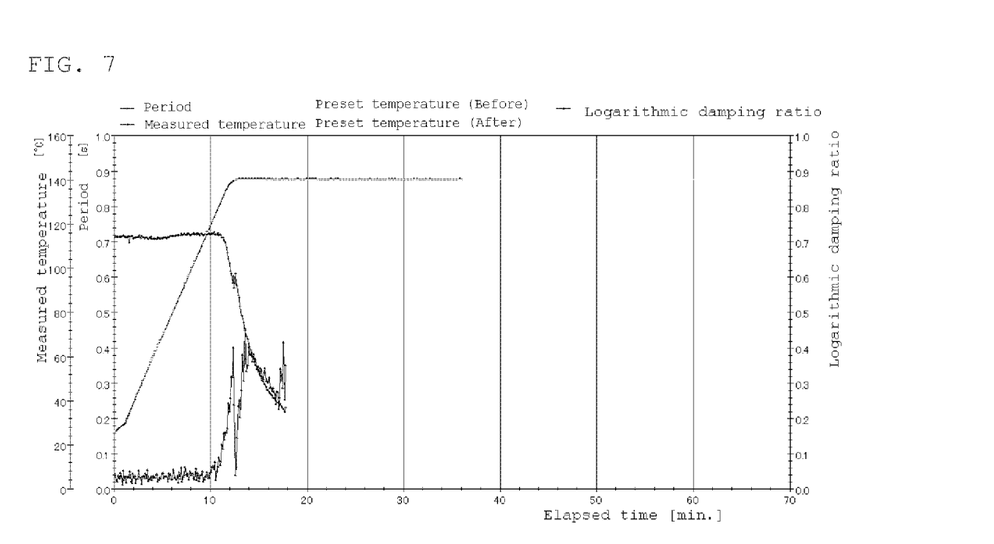
FIG. 7 is a rigid body pendulum data at 140° C. of Example 10.
Figure 8:
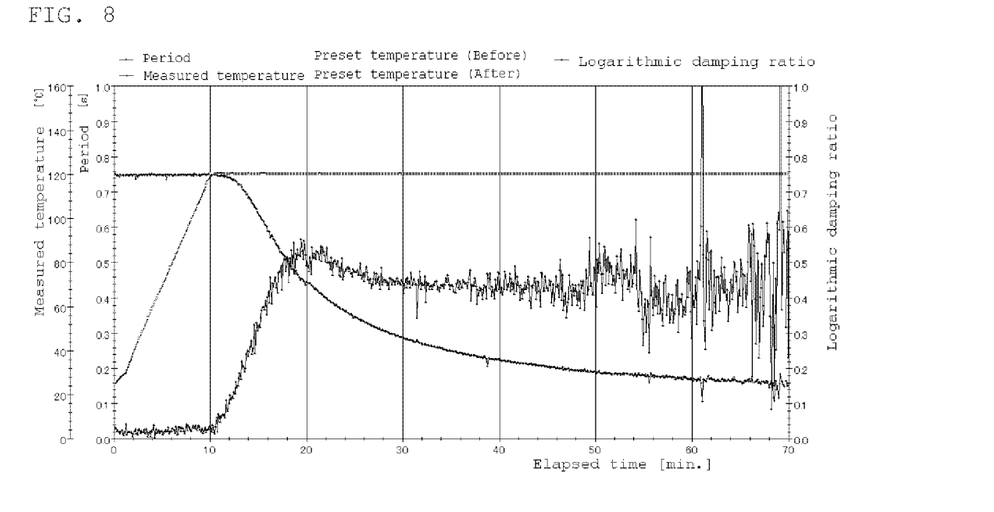
FIG. 8 is a rigid body pendulum data at 120° C. of Example 11.

|  | Example 10 | Example 11 |
| --- | --- | --- |
| Water resistance | ○ | ○ |
| Rigid body pendulum | FIG. 7 | FIG. 8 |

In Examples 1 to 9, crosslinking progressed and good results with a gel fraction of 80% or more were obtained. From this fact, it is obvious that the reaction progressed even in intramolecular crosslinking, intermolecular crosslinking, aqueous system (emulsion, water-soluble solvent), and a crosslinked film was efficiently obtained. When primary esters were used, or Tg was relatively high, the results of xylene rubbing and water resistance were poor. Further, if the crosslinking reaction was slow as can be seen from the rigid body pendulum test, the results were bad.

In Example 9, the supplemental addition of a small amount of blocked isocyanate used as a thermal curing agent further increases the curing rate, and any prescriptions combined with various reaction systems may be possible.

In Examples 10 to 11, when those having a tertiary ester at the end of the side chain which was lengthened from the polymer main chain was used, the curing was efficiently proceeded and the curing rate was increased. It was also possible to lower the curing temperature.

In Comparative Example 5 using no tertiary ester group, it was impossible to obtain a cured product having sufficient performance in xylene rubbing and water resistance.

The evaluations in tables 3 and 4 were carried out by the following measuring methods.

The gel fraction was determined, by dissolving the film obtained in Examples using Soxhlet for 30 minutes in acetone reflux, and measuring the residual weight % of the film as gel fraction.

In xylene rubbing, the thermosetting resin of the example was coated on a PET film and rubbed 10 times with a medicinal gauze impregnated with xylene. After drying the xylene, whitening and dissolving of the film was evaluated as x, slightly dissolving as Δ, and no change as ○.

For evaluation of water resistance, the curable resin of the example was applied to a glass plate, treated at each baking temperature, and semi-soaked in warm water at 80° C. for 5 hours. When the immersed portion of the film became white turbid to swollen, it was evaluated as X, and when the film was recovered to be transparent at room temperature, it was evaluated as Δ, and when the film did not change at all, it was evaluated as ○.

Rigid Body Pendulum Tester

Using a rigid body pendulum tester (model number RPT-3000 W) manufactured by A & D Corporation, the temperature was raised up to each temperature (120° C., 140° C., 150° C., 170° C.) at a heating rate of 10° C./min. and held. And the change in the period and the logarithmic damping ratio was obtained. In particular, it was used to check the cured state of the coating film.

Pendulum: FRB-100
Film thickness (WET): 100 μm

The results are shown in FIGS. 1 to 8, From these results, it is apparent that the thermosetting resin composition of the example has superior curing performance as compared with the thermosetting resin composition of the comparative example. Furthermore, if the composition of Patent Document 1 is a solvent-type thermosetting resin composition, sufficient curing performance cannot be obtained. Further, it has the same degree of thermosetting properties as that of baked coatings of isocyanate type, melamine type and acid epoxy type which are commonly used for automobile coating,

INDUSTRIAL APPLICABILITY

The thermosetting resin composition of the present, invention can be used as various coating compositions or adhesive compositions.

The invention claimed is:

1. A thermosetting resin composition comprising:
a polymer (A) composed of a monomer having a (meth) acrylic acid tertiary alkyl ester and a monomer having a hydroxyl group as a structural unit, and a transesterification catalyst (B) as an essential component, and
wherein the thermosetting resin composition is an organic solvent solution or a water-borne solution,
wherein the polymer (A) has a glass transition temperature of 80° C. or lower.

* * * * *